(12) United States Patent
Woodham

(10) Patent No.: US 9,151,485 B2
(45) Date of Patent: Oct. 6, 2015

(54) BUCKLE ASSEMBLY WITH LIGHT EMITTING DIODE AND OPTICAL GUIDE

(71) Applicant: GM GLOBAL TECHNOLOGY OPERATIONS LLC, Detroit, MI (US)

(72) Inventor: Darryle R. Woodham, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 268 days.

(21) Appl. No.: 13/773,967

(22) Filed: Feb. 22, 2013

(65) Prior Publication Data

US 2014/0239853 A1 Aug. 28, 2014

(51) Int. Cl.
| | |
|---|---|
| H05B 37/02 | (2006.01) |
| H05B 39/06 | (2006.01) |
| H05B 41/04 | (2006.01) |
| H05B 41/18 | (2006.01) |
| F21V 33/00 | (2006.01) |
| B60R 22/48 | (2006.01) |
| A44B 11/25 | (2006.01) |

(52) U.S. Cl.
CPC ......... *F21V 33/0064* (2013.01); *A44B 11/2565* (2013.01); *B60R 22/48* (2013.01); *H05B 37/02* (2013.01); *A44B 11/2515* (2013.01); *B60R 2022/4816* (2013.01); *B60R 2022/4866* (2013.01)

(58) Field of Classification Search
CPC ............ B60R 22/48; B60R 2022/4816; B60R 21/01546; B60R 2022/4866; B60R 2021/01265
USPC ........... 340/457.1, 457, 438, 687; 701/45, 36; 108/268, 271; 208/801.1; 315/362
See application file for complete search history.

(56) References Cited

U.S. PATENT DOCUMENTS

| | | | | |
|---|---|---|---|---|
| 3,897,611 | A * | 8/1975 | Booth et al. | 24/628 |
| 8,659,414 | B1 * | 2/2014 | Schuk | 340/457 |
| 2012/0089302 | A1 * | 4/2012 | Griffin | 701/45 |

* cited by examiner

*Primary Examiner* — Lincoln Donovan
*Assistant Examiner* — Diana J Cheng
(74) *Attorney, Agent, or Firm* — Quinn Law Group, PLLC

(57) ABSTRACT

A buckle assembly is configured to releasably interlock with a seat belt tongue. The assembly includes a light emitting diode (LED) positioned at least partially within a housing. The LED is configured to emit a light when the seat belt tongue is not interlocked with the assembly. An optical guide is positioned at least partially within the housing and composed of a substantially light transmitting material. The LED is positioned such that the light emitted by the LED passes through the optical guide. In a first embodiment, the optical guide is an ejector member at least partially positioned within the housing. In a second embodiment, the optical guide is a lens at least partially positioned within the housing.

15 Claims, 3 Drawing Sheets

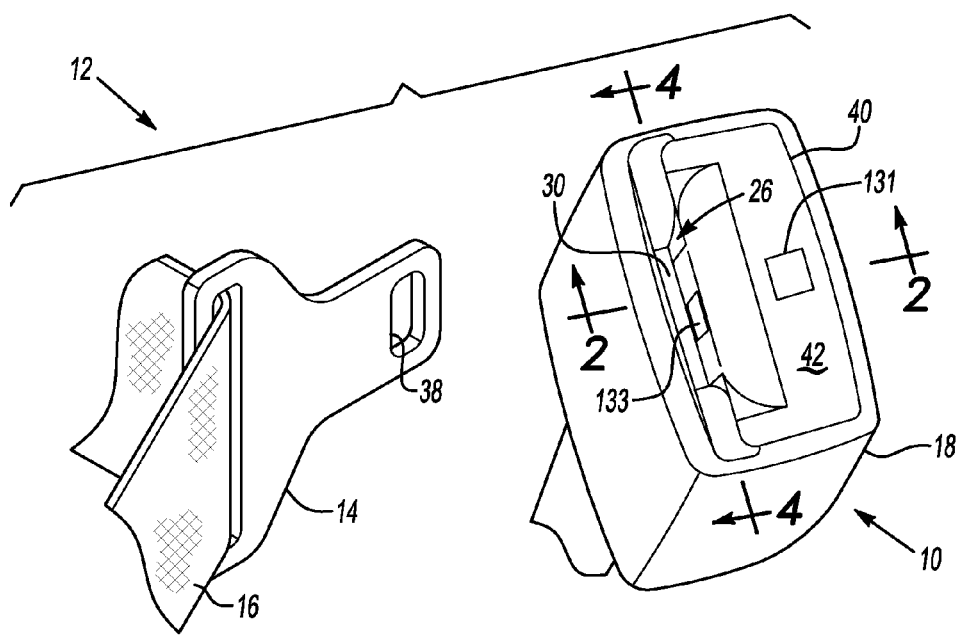
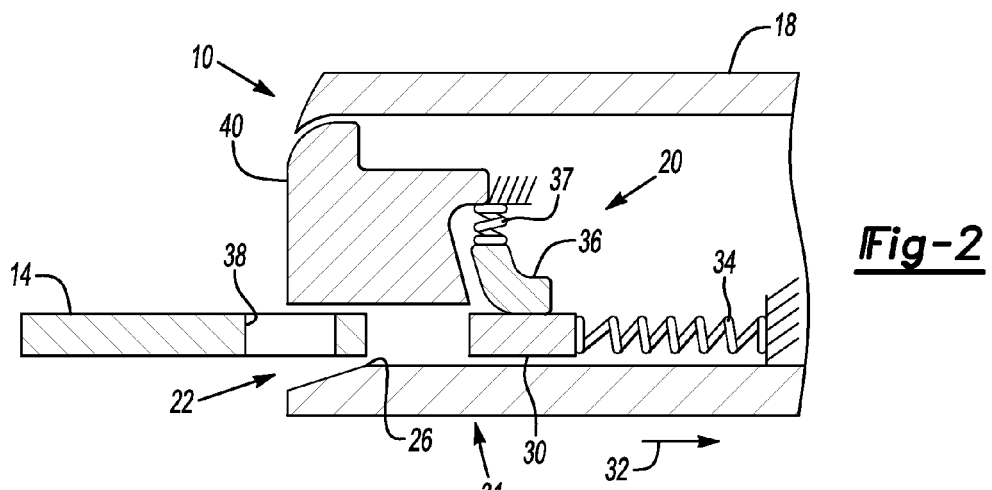
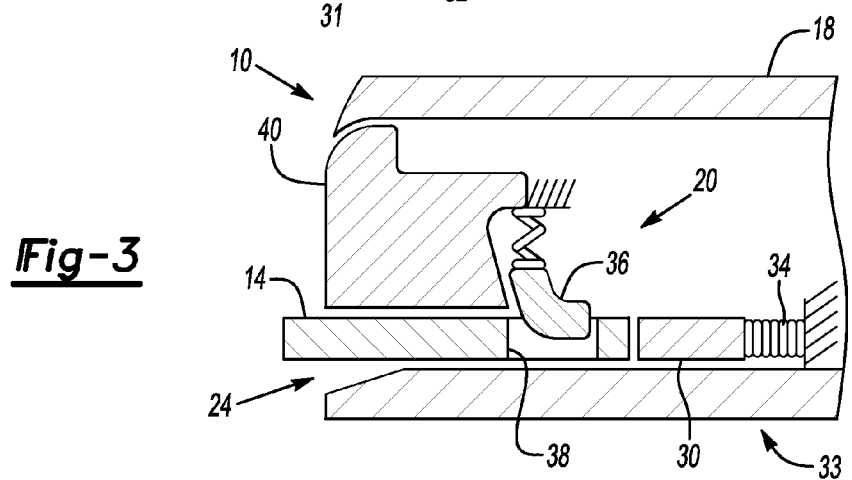

BUCKLE ASSEMBLY WITH LIGHT EMITTING DIODE AND OPTICAL GUIDE

TECHNICAL FIELD

The disclosure relates generally to a buckle assembly in a vehicle and more particularly, to a buckle assembly having a light emitting diode and optical guide.

BACKGROUND

A vehicle seat belt system typically includes seat belt webbing, a seat belt tongue on the webbing, and a buckle assembly. The seat belt tongue on the webbing is inserted and locked in the buckle assembly to secure the seat belt webbing. In a dark and/or unfamiliar vehicle interior, the location of the buckle assembly may not be easily identifiable.

SUMMARY

A buckle assembly is configured to releasably interlock with a seat belt tongue. The assembly includes a light emitting diode (LED) positioned at least partially within a housing. The LED is configured to emit a light when the seat belt tongue is not interlocked with the assembly. An optical guide is positioned at least partially within the housing and composed of a substantially light transmitting material. The LED is positioned such that the light emitted by the LED passes through the optical guide. The light emitted by the LED aids in the location or identification of the buckle assembly in a dark and/or unfamiliar vehicle interior.

An ejector member may be at least partially positioned within the housing. The ejector member is movable between a first and second position corresponding to a released and locked position of the seat belt tongue, respectively. The ejector member may be biased to eject the seat belt tongue from a cavity in the housing configured to receive the seat belt tongue. The assembly may include any type of mechanism for releasably interlocking with the seat belt tongue. In one example, a jutting member may be positioned at least partially within the housing and biased to lock the seat belt tongue in the cavity. The assembly may include a pushbutton configured to unlock the seat belt tongue from the cavity when the pushbutton is depressed.

In a first embodiment, the optical guide is the ejector member. In the first embodiment, the ejector member serves a dual function of being the optical guide and being part of the mechanism for releasably interlocking with the seat belt tongue. The ejector member may include an incident surface and a transmitting surface. A first portion of the light emitted by the LED enters the ejector member at the incident surface and exits the ejector member at the transmitting surface. The incident surface of the ejector member is configured to maximize the light entering the ejector member. The transmitting surface of the ejector member is configured to scatter the light exiting the ejector member at the transmitting surface.

In a second embodiment, the optical guide is a lens at least partially positioned within the housing. In this embodiment, the ejector member serves a single function of being part of the mechanism for releasably interlocking with the seat belt tongue. The lens may include a first segment and a second segment. A first portion of the light emitted by the LED is configured to travel through the first segment of the lens and is transmitted through a first window in a first wall defined by the pushbutton. A second portion of the light emitted by the LED is configured to travel through the second segment of the lens and is transmitted through a second window in a second wall defined by the pushbutton. The second wall may be substantially perpendicular to the first wall.

The lens may include an incident surface and a first and a second transmitting surface. A first and a second portion of the light emitted by the LED enter the lens at the incident surface. The first and second portions of the light exit the lens at the first and second transmitting surfaces, respectively. At least a portion of the incident surface defines a substantially semi-circular shape. The first and second transmitting surfaces of the lens may be configured to scatter the first and second portions of the light, respectively. The pushbutton may include a first section defining a depressible push surface and a first and a second leg extending away from the first section. A second section is contiguous with the first section and positioned between the first and second legs. The LED and the lens may be positioned at least partially within a hollow space defined by the second section.

A circuit board may be operatively connected to and configured to operate the LED. The circuit board may include at least one resistor. A carrier may be configured to operatively connect the circuit board and the LED to the housing. The carrier may include at least one protrusion configured to snap into an aperture in the housing, thereby retaining the LED and circuit board fixedly relative to the housing.

A vehicle is disclosed with a seat belt tongue, the buckle assembly described above and a latch sensor operatively connected to the assembly. The latch sensor is configured to detect whether the seat belt tongue is interlocked with the assembly. The latch sensor may include at least one hall effect sensor configured to sense the position of a magnetic element fixedly connected to the ejector member and within proximity of the latch sensor, thereby detecting whether the seat belt tongue is interlocked with the assembly. The latch sensor may include an optical proximity sensor configured to detect the position of the ejector member.

A controller is operatively connected to the latch sensor and the LED. The latch sensor is configured to transmit a first signal to the controller when the seat belt tongue is not interlocked with the assembly and a second signal to the controller when the seat belt tongue is interlocked with the assembly. The controller is configured to activate the LED to emit a first color upon receiving the first signal from the latch sensor. The controller may be configured to activate the LED to emit a second color upon receiving the second signal from the latch sensor. Thus the LED provides visual feedback of one or both of the front and rear seat occupant seat belt status.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic perspective view of a buckle assembly configured to releasably interlock with a seat belt tongue; and FIG. 2 is a schematic fragmentary sectional view through axis 2-2 of the assembly of FIG. 1, showing the seat belt tongue in an unlocked position;

FIG. 3 is a schematic fragmentary sectional view through axis 2-2 of the assembly of FIG. 1, showing the seat belt tongue in a locked position;

DETAILED DESCRIPTION

Figure 4:
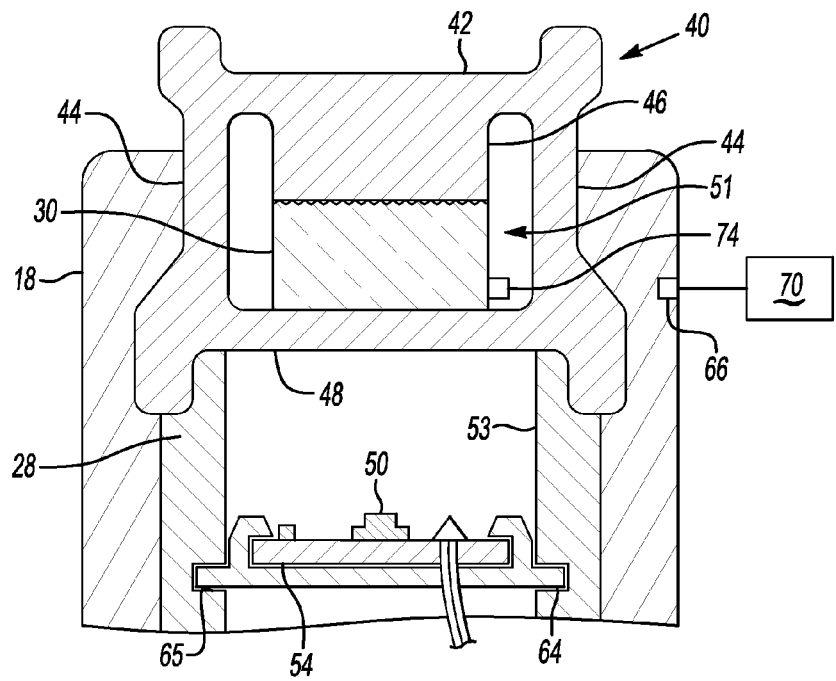
FIG. 4 is a schematic fragmentary sectional view through axis 4-4 of the assembly of FIG. 1, showing the assembly with a light emitting diode (LED) and an optical guide in accordance with a first embodiment.

Referring to the Figures, wherein like reference numbers refer to the same or similar components throughout the several views, FIG. 1 shows a buckle assembly 10 that may be employed in a vehicle 12. FIGS. 2 and 3 are schematic fragmentary sectional views through axis 2-2 of the assembly 10. Referring to FIG. 1, the vehicle 12 includes a seat belt tongue 14 (referred to herein as 'tongue 14') operatively connected to a seat belt webbing 16. The assembly 10 includes a housing 18. The assembly 10 is configured to releasably interlock with the tongue 14. FIG. 2 shows the tongue 14 in a released position 22 while FIG. 3 shows the tongue 14 in a locked position 24 relative to the assembly 10.

Referring to FIG. 1, the housing 18 includes a cavity 26 for receiving the tongue 14. Referring to FIGS. 2-3, the assembly includes an ejector member 30 movable between first and second positions 31, 33 corresponding to the released and locked positions 22, 24 of the tongue 14. Referring to FIGS. 2-3, the ejector member 30 may be biased to eject the tongue 14 from the cavity 26, for example, through ejector spring 34. The ejector member 30 is also shown in FIGS. 1-5.

Referring to FIG. 2, as the tongue 14 is inserted in the cavity 26, the ejector member 30 is moved along the direction 32, against the bias of an ejector spring 34. Referring to FIGS. 2-3, the assembly 10 includes a jutting member 36 configured to lock the tongue 14 in the cavity 26, i.e., prevent removal of the tongue 14 from the assembly 10. As the tongue 14 moves further along direction 32, the jutting member 36 is aligned with and enters a hole 38 in the tongue 14, thereby moving the tongue 14 into the locked position 24. The jutting member 36 may be operatively connected to a compression spring 37 that biases the jutting member 36 in a locked position corresponding to the locked position 24 of the tongue 14.

Referring to FIGS. 1-3, a pushbutton 40 may be employed to unlock the tongue 14 from the cavity 26 when the pushbutton 40 is depressed. In order to release the tongue 14 from the assembly 10, the pushbutton 40 may be pushed or moved in the direction 32 (shown in FIG. 2), against a biasing member (not shown) or other mechanism, thereby urging or moving the jutting member 36 out of the hole 38 in the tongue 14. As a result, the ejector spring 34 moves the ejector member 30 in the opposite of direction 32, ejecting the tongue 14 out of the cavity 26 in the assembly 10. Note that the mechanism 20 illustrated in FIGS. 2-3 is presented as a non-limiting example and any other suitable mechanism for releasably interlocking the tongue 14 may be used. The assembly 10 may include any other components or parts capable of releasably interlocking with the tongue 14.

FIG. 4 is a schematic fragmentary sectional view through axis 4-4 of the assembly 10. Referring to FIG. 4, the housing 18 includes a frame 28 for supporting various components of the assembly 10. For clarity, only the frame 28 and pushbutton 40 are shown in FIG. 4 while other support structures are removed. Referring to FIG. 4, the pushbutton 40 may include a first section 42 defining a depressible push surface and first and second legs 44 extending away from the first section 42. A second section 46 of the pushbutton 40 may be contiguous with the first section 42 and positioned between the first and second legs 44. A third section 48 of the pushbutton 40 connects and is substantially perpendicular the first and second legs 44.

Figure 5:
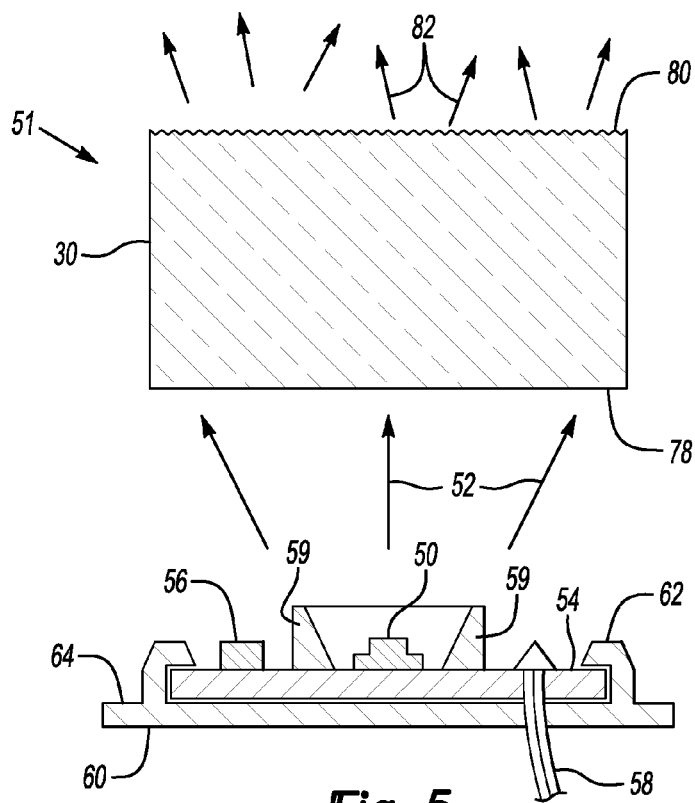
FIG. 5 is an enlarged view of a portion of FIG. 4, showing transmission of light from the LED through the optical guide.

Referring to FIG. 4, a light-emitting diode 50, referred to herein as "LED 50", is positioned at least partially within the housing 18. As is known to those skilled in the art, a light-emitting diode converts electrical energy into light. FIG. 5 is an enlarged view of a portion of FIG. 4, showing transmission of light 52 from the LED 50 through an optical guide 51. The LED 50 is configured to emit the light 52 when the tongue 14 is not interlocked with the assembly, i.e., when the tongue 14 is in the released position 22. The light 52 provides location information or identification of the buckle assembly 10 in a dark and/or unfamiliar vehicle interior.

Referring to FIGS. 4-5, the optical guide 51 is positioned at least partially within the housing 18 and composed of a substantially light transmitting material. The LED 50 is positioned such that the light 52 emitted by the LED 50 passes through the optical guide 51. Referring to FIG. 4, the LED 50 may be positioned in a central opening 53 defined by the frame 28. However, the LED 50 may be positioned elsewhere at least partially within the housing 18 such that the light 52 emitted is visible outside of the assembly 10. For example, the optical guide 51 may be composed of an acrylic, polycarbonate, glass, or other suitable material. A polycarbonate material is almost completely transparent through the visible spectrum until approximately 400 nm. PC 1000 machine grade polycarbonate is a transparent thermoplastic which has excellent impact resistance and overall stiffness. The polycarbonate material has a high heat deflection temperature, absorbs very little moisture and is able to resist acidic solutions.

Any suitable type of LED 50 may be employed with the exact specification selected based on the particular application at hand. For example, an LED 50 that operates between approximately 30-60 mW of electrical power may be used. In one example, an LED 50 is employed that emits red, orange, yellow and green light and consumes 20 mA at around 2 V, with the wattage being approximately 40 mW. In another example, an LED 50 is employed that emits blue, violet, and white light and consumes 20 mA at 4-5 V, with the wattage being approximately 100 mW.

Referring to FIGS. 4-5, a circuit board 54 is operatively connected to and configured to operate the LED 50. The circuit board 54 (and thus LED 50) is connected to a power source through wires 58. In one example, the vehicle 12 is the power source, e.g. through the engine and/or battery of the vehicle 12. Any other power source, such as a separate battery (not shown) may be used. The circuit board 54 is configured to support the functioning of the LED 50 and may include any electronic components required for the functioning of the LED 50. For example, the circuit board 54 may include at least one resistor 56. The resistor 56 may be tunable or modifiable to alter the intensity of the light 52 emitted by the LED 50. Referring to FIG. 5, beam guides or reflectors 59 may be connected to the circuit board 54 and configured to guide the light 52 emitted by the LED 50.

Referring to FIGS. 4-5, a carrier 60 may be positioned at least partially within the housing 18 and configured to operatively connect the circuit board 54 and the LED 50 to the housing 18. The carrier 60 may be formed, for example injection molded, from a polymeric material. Referring to FIG. 5, the carrier 60 may include at least one hook member 62 configured to retain or hold onto the circuit board 54. The carrier 60 may include at least one protrusion 64 configured to snap into a corresponding aperture 65 in the assembly 10, thereby retaining the LED 50 and circuit board 54 fixedly relative to the housing 18. Alternatively, the LED 50 and circuit board 54 may be held in place in the housing 18 by being attached to housing posts (not shown) in the frame 28 (shown in FIG. 4).

Referring to FIG. 4, the vehicle 12 may include a latch sensor 66 operatively connected to the assembly 10 and configured to detect whether the tongue 14 is interlocked with the assembly 10. The latch sensor 66 may be mounted to any portion of the assembly 10. In one example, the latch sensor 66 detects whether the tongue 14 is in the released position 22 or locked position 24 (shown in FIGS. 2-3, respectively) by sensing the position of the ejector member 30 (shown in FIGS. 1-4). Referring to FIG. 4, the latch sensor 66 may include at least one hall effect sensor configured to sense the position of a magnetic element 74 that is rigidly or fixedly operatively connected to the ejector member 30. As the ejector member 30 moves between the first and second positions 31, 33 (see FIGS. 2-3) the magnetic element 74 mounted to the ejector member 30 also moves, thereby altering the local magnetic field. As is known to those of ordinary skill in the art, a hall effect sensor varies its output voltage in response to changes in magnetic field.

In another example, the latch sensor 66 may be an optical proximity sensor configured to detect the position of the ejector member 30, without requiring a magnetic element 74. In another embodiment, the latch sensor 66 is a mechanical switch that switches between two states, i.e. turns on/off, as the ejector member 30 moves between the first and second positions 31, 33 (see FIGS. 2-3). The latch sensor 66 includes any necessary circuitry that allows it to act in a digital (on/off) mode. Any suitable device or method may be employed by the latch sensor 66.

Referring to FIG. 4, a controller 70 may be operatively connected to the latch sensor 66 and LED 50. The controller 70 may be the vehicle body control module or any other control module. The latch sensor 66 is configured to transmit a first signal to the controller 70 when the tongue 14 is not interlocked with the assembly 10 and a second signal to the controller 70 when the tongue 14 is interlocked with assembly 10. The controller 70 is configured to activate the LED 50 (through the circuit board 54) to emit light 52 upon receiving the first signal from the latch sensor 66. The light 52 may be of any color. The controller 70 may be configured to deactivate the LED 50 upon receiving the second signal from the latch sensor 66. Alternatively, the controller 70 may be configured to activate the LED 50 to emit a first color upon receiving the first signal from the latch sensor 66 and to activate the LED 50 to emit a second color upon receiving the second signal from the latch sensor 66. This may be achieved by using bi-color or bi-polar diodes that are known to those skilled in the art. The bi-color light emitting diodes generally include two different LED emitters configured such that current flow in one direction emits the first color, and current flow in the opposite direction emits the second color.

Referring to FIGS. 4-5, in a first embodiment, the optical guide 51 is the ejector member 30. In the first embodiment, the ejector member 30 serves the dual function of being the optical guide 51 and being part of the mechanism 20 for releasably interlocking the tongue 14 in the assembly 10. In this embodiment, the ejector member 30 is composed of a substantially light transmitting material. For example, the ejector member 30 may be composed of acrylic, polycarbonate, glass, or other suitable material.

Referring to FIG. 5, the ejector member 30 may include an incident surface 78 and a transmitting surface 80. The light 52 emitted by the LED 50 enters the ejector member 30 at the incident surface 78 and exits the ejector member 30 at the transmitting surface 80. The incident surface 78 of the ejector member 30 is configured to maximize the light 52 entering the ejector member 30, for example, by having a sufficiently polished surface. The transmitting surface 80 of the ejector member 30 is configured to produce scattered light 82 exiting the ejector member 30 at the transmitting surface, for example, by having a sufficiently grainy surface. The scattered light 82 prevents a hot spot within the assembly 10.

Figure 6:
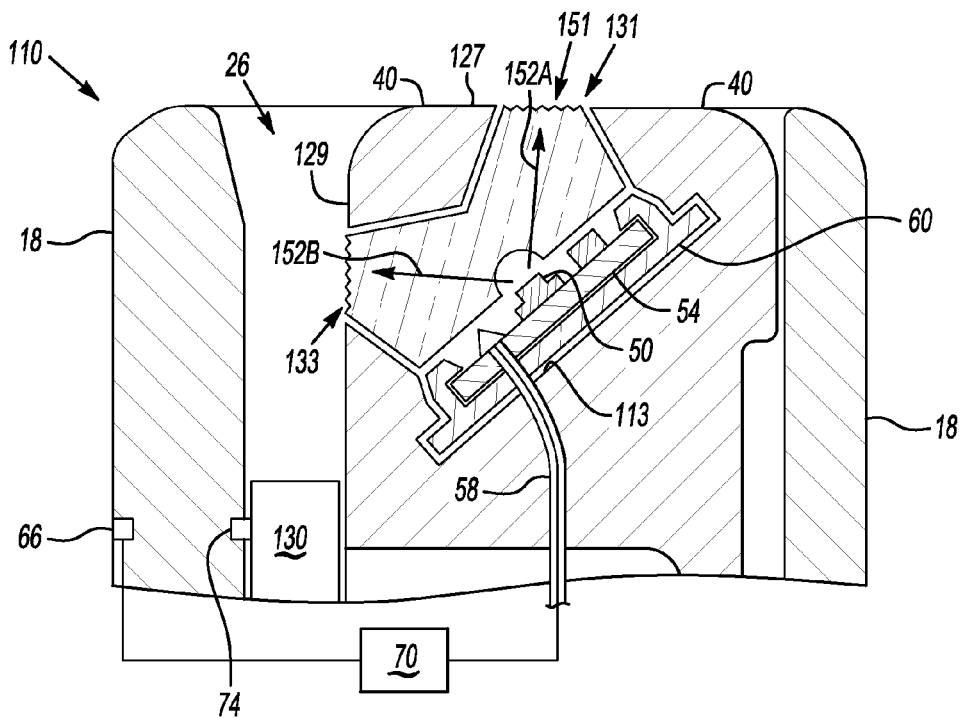
FIG. 6 is a schematic fragmentary sectional view of a buckle assembly having an LED and an optical guide, in accordance with a second embodiment.
Figure 7:
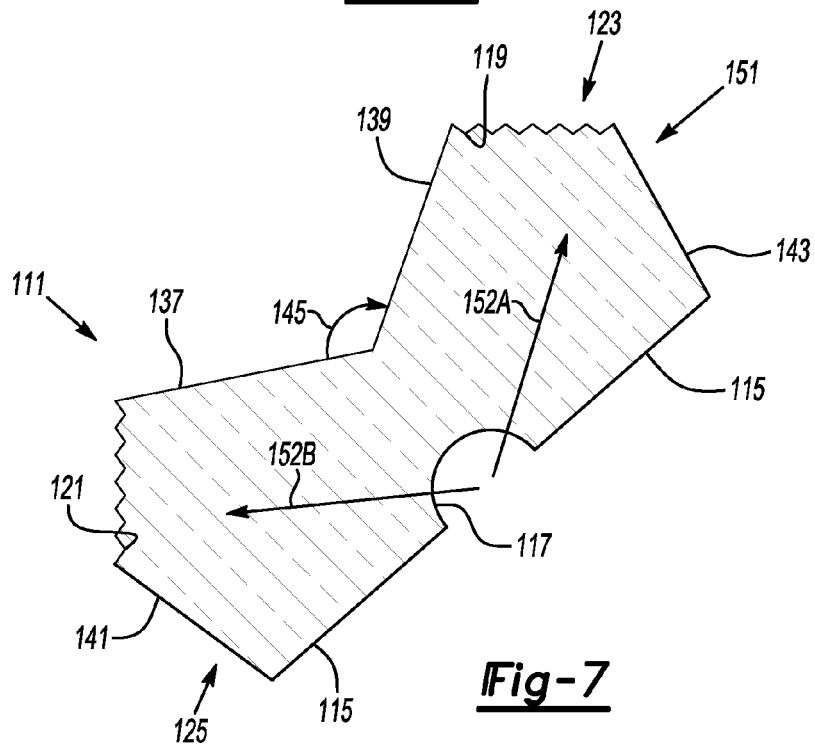
FIG. 7 is an enlarged view of the optical guide of FIG. 6.

FIG. 6 is schematic perspective view of a second embodiment of a buckle assembly 110 having an LED 50 and an optical guide 151. In the second embodiment, the optical guide 151 is a lens 111 at least partially positioned within the housing 18. FIG. 7 is an enlarged view of the optical guide 151 or lens 111 of FIG. 6. Except as described below, the second embodiment is similar to the first embodiment and wherein like reference numbers refer to the same or similar components.

Referring to FIGS. 6-7, the lens 111 is composed of a substantially light transmitting material. For example, the lens 111 may be composed of acrylic, polycarbonate, glass, or other suitable material. In the second embodiment, the ejector member 130 (see FIG. 6) performs the single function as being part of the mechanism 20 for releasably interlocking the tongue 14 in the assembly 10. Thus, in the second embodiment, the ejector member 130 may be composed of a material that does not transmit light, for example, a metal.

Referring to FIG. 7, the lens 111 is bifurcated such that it includes a first segment 123 and a second segment 125. Referring to FIG. 6, the pushbutton 40 defines a first and a second wall 127, 129, each having a first and a second window 131, 133 respectively. The second wall 129 may be substantially perpendicular to the first wall 127. The lens 111 extends between the first and second walls 127, 129. Referring to FIGS. 6-7, a first portion 152A of the light emitted by the LED 50 is configured to travel through the first segment 123 of the lens 111 and is transmitted through the first window 131 in the first wall 127 of the pushbutton 40. Referring to FIGS. 6-7, a second portion 152B of the light emitted by the LED 50 is configured to travel through the second segment 125 of the lens 111 and is transmitted through the second window 133 in the second wall 129 of the pushbutton 40.

Referring to FIG. 6, the LED 50 and the lens 111 may be positioned within a hollow space 113 in the pushbutton 40 and held in place by the carrier 60. In one example, the hollow space 113 is carved out inside the second section 46 (shown in FIG. 4) of the pushbutton 40.

Referring to FIG. 7, the lens 111 may include an incident surface 115 and first and second transmitting surfaces 119, 121. At least a portion of the incident surface 115 defines a substantially semi-circular shape, referred to herein as cut-out 117. The cut-out 117 is configured to increase the efficiency of light transmission from the LED 50 to the lens 111. Referring to FIGS. 6-7, the first portion 151 of the light emitted by the LED 50 enters the lens 111 at the incident surface 115 (at the cutout 117) and exits the lens 111 at the first transmitting surface 119. Referring to FIGS. 6-7, the second portion 152 of the light emitted by the LED 50 enters the lens 111 at the incident surface 115 (at the cutout 117) and exits the lens 111 at the second transmitting surface 121.

Referring to FIG. 7, the first and second transmitting surfaces 119, 121 of the lens 111 may be configured to scatter the first and second portions 151, 152 of the light, respectively, for example, by having a sufficiently grainy surface. Referring to FIG. 7, the lens 111 also includes first, second, third and fourth sides 137, 139, 141 and 143, respectively. The first and second sides 137, 139 subtend an angle 145. In one example, the angle 145 is between approximately 90 and 175 degrees.

Referring to FIGS. 4 and 6, the controller 70 may include various sensors, computing devices and control modules, electronic control units (ECUs), or at least one processor and/or a memory which includes instructions stored thereon (or in another computer-readable medium) for carrying out the processes as described above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

The controller 70 may also include sufficient transitory memory, e.g., random access memory (RAM), so that transient signals, which are not considered storage media herein, may be transmitted, received, and processed as needed. The controller 70, whether configured as a single computer device or a distributed system, may include other components as needed, such as but not limited to high-speed clocks, timers, analog-to-digital (A/D) circuitry, digital-to-analog (D/A) circuitry, digital signal processors, and any necessary input/output (I/O) devices and/or other signal conditioning and/or buffer circuitry. A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A buckle assembly configured to releasably interlock with a seat belt tongue, the assembly comprising:
    a housing;
    a light-emitting diode (LED) positioned at least partially within the housing, the LED being configured to emit a light when the seat belt tongue is not interlocked with the assembly;
    an optical guide positioned at least partially within the housing and composed of a substantially light transmitting material, the LED being positioned such that the light emitted by the LED passes through the optical guide;
    wherein the optical guide is a lens at least partially positioned within the housing;
    wherein the lens includes a first segment and a second segment;
    a pushbutton positioned at least partially within the housing, wherein the pushbutton defines a first and a second wall having a first and a second window, respectively;
    wherein the first segment of the lens is configured to guide a first portion of the light emitted by the LED to travel through the first segment of the lens, the first portion of the light being transmitted through the first window in the first wall of the pushbutton; and
    wherein the second segment of the lens is configured to guide a second portion of the light emitted by the LED to travel through the second segment of the lens, the second portion of the light being transmitted through the second window in the second wall of the pushbutton.

2. The assembly of claim 1, further comprising:
    an ejector member at least partially positioned within the housing, the ejector member being movable between a first and second position corresponding to a released and locked position of the seat belt tongue, respectively.

3. The assembly of claim 2, in combination with the seat belt tongue, wherein:
    the housing includes a cavity for receiving the seat belt tongue; and
    the ejector member is biased to eject the seat belt tongue from the cavity.

4. The assembly of claim 2, in combination with the seat belt tongue, further comprising:
    a jutting member positioned at least partially within the housing;
    wherein the housing includes a cavity for receiving the seat belt tongue, the jutting member being biased to lock the seat belt tongue in the cavity; and
    a pushbutton configured to unlock the seat belt tongue from the cavity when the pushbutton is depressed.

5. The assembly of claim 1, wherein the second wall is substantially perpendicular to the first wall.

6. The assembly of claim 1, wherein:
    the lens includes an incident surface and a first and a second transmitting surfaces;
    wherein a first and a second portion of the light emitted by the LED enter the lens at the incident surface; and
    wherein the first and second portions of the light exit the lens at the first and second transmitting surfaces, respectively.

7. The assembly of claim 6, wherein:
    at least a portion of the incident surface defines a substantially semi-circular shape; and
    the first and second transmitting surfaces of the lens are configured to scatter the first and second portions of the light, respectively.

8. The assembly of claim 1, wherein the pushbutton includes:
    a first section defining a depressable push surface;
    a first and a second leg extending away from the first section;
    a second section contiguous with the first section and positioned between the first and second legs, the second section defining a hollow space; and
    wherein the LED and the lens are positioned at least partially within the hollow space in the second section.

9. The assembly of claim 1, further comprising:
a circuit board operatively connected to and configured to operate the LED, the circuit board including at least one resistor.

10. The assembly of claim 9, further comprising:
a carrier configured to operatively connect the circuit board and the LED to the housing;
an aperture in the housing configured to receive at least a portion of the carrier; and
wherein the carrier includes at least one protrusion configured to snap into the aperture in the housing, thereby retaining the LED and circuit board fixedly relative to the housing.

11. A vehicle comprising:
a seat belt tongue;
a buckle assembly configured to releasably interlock with the seat belt tongue, wherein the assembly includes:
  a housing having a cavity configured to receive the seat belt tongue;
  a light-emitting diode (LED) positioned at least partially within the housing, the LED being configured to emit a light when the seat belt tongue is not interlocked with the assembly;
  a pushbutton positioned at least partially within the housing, wherein the pushbutton defines a first and a second wall having a first and a second window, respectively; and
  an optical guide positioned at least partially within the housing and composed of a substantially light transmitting material, the LED being positioned such that the light emitted by the LED passes through the optical guide;
wherein the optical guide is a lens at least partially positioned within the housing, the lens including a first segment and a second segment;
wherein the first segment of the lens is configured to guide a first portion of the light emitted by the LED to travel through the first segment of the lens, the first portion of the light being transmitted through the first window in the first wall of the pushbutton; and
wherein the second segment of the lens is configured to guide a second portion of the light emitted by the LED to travel through the second segment of the lens, the second portion of the light being transmitted through the second window in the second wall of the pushbutton;
a latch sensor operatively connected to the assembly and configured to detect whether the seat belt tongue is interlocked with the assembly;
a controller operatively connected to the latch sensor and the LED;
wherein the latch sensor is configured to transmit a first signal to the controller when the seat belt tongue is not interlocked with the buckle assembly and a second signal to the controller when the seat belt tongue is interlocked with the buckle assembly; and
wherein the controller is configured to activate the LED to emit a first color upon receiving the first signal from the latch sensor.

12. The vehicle of claim 11, wherein the controller is configured to activate the LED to emit a second color upon receiving the second signal from the latch sensor.

13. The vehicle of claim 11, further comprising:
an ejector member at least partially positioned within the housing, the ejector member being movable between a first and second position corresponding to a released and locked position of the tongue, respectively.

14. The vehicle of claim 13, further comprising:
a magnetic element fixedly connected to the ejector member and within a proximity of the latch sensor; and
wherein the latch sensor includes at least one hall effect sensor configured to sense the position of the magnetic element, thereby detecting whether the seat belt tongue is interlocked with the assembly.

15. The vehicle of claim 13, wherein the latch sensor includes an optical proximity sensor configured to detect the position of the ejector member.

* * * * *